United States Patent
Nakamura (10) Patent No.: US 11,026,053 B2
(45) Date of Patent: Jun. 1, 2021

(54) INFORMATION PROCESSING SYSTEM, INFORMATION PROCESSING APPARATUS, AND NON-TRANSITORY COMPUTER READABLE MEDIUM FOR SECURITY ALERT NOTIFICATION

(71) Applicant: FUJI XEROX CO., LTD., Tokyo (JP)

(72) Inventor: Takashi Nakamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 378 days.

(21) Appl. No.: 15/914,550

(22) Filed: Mar. 7, 2018

(65) Prior Publication Data
US 2019/0037361 A1 Jan. 31, 2019

(30) Foreign Application Priority Data
Jul. 27, 2017 (JP) .............................. JP2017-145756

(51) Int. Cl.
*H04W 24/00* (2009.01)
*H04B 3/00* (2006.01)
*H04M 1/00* (2006.01)
*H04W 4/029* (2018.01)
*H04L 29/08* (2006.01)
*H04W 4/12* (2009.01)
*H04W 4/02* (2018.01)
*H04W 4/70* (2018.01)

(52) U.S. Cl.
CPC ............ *H04W 4/029* (2018.02); *H04L 67/18* (2013.01); *H04W 4/025* (2013.01); *H04W 4/12* (2013.01); *H04W 4/70* (2018.02)

(58) Field of Classification Search
CPC ....... H04W 4/029; H04W 4/70; H04W 4/025; H04W 4/12; H04L 67/18

USPC ........................................................ 455/456.3
See application file for complete search history.

(56) References Cited

U.S. PATENT DOCUMENTS

| 8,396,452 B1 * | 3/2013 | Matsuoka | G06F 21/35 |
| | | | 455/410 |
| 9,813,882 B1 * | 11/2017 | Masterman | H04W 4/18 |
| 10,631,165 B1 * | 4/2020 | Goyal | H04W 12/08 |
| 2002/0078362 A1 * | 6/2002 | Matsui | G06F 21/35 |
| | | | 713/185 |

(Continued)

FOREIGN PATENT DOCUMENTS

| JP | 2007036672 A | * 2/2007 |
| JP | 2014-068055 A | 4/2014 |

(Continued)

OTHER PUBLICATIONS

Machine Translation of the Description of the Invention of JP-2007036672-A from the JPO website.*

(Continued)

*Primary Examiner* — Mark G. Pannell
(74) *Attorney, Agent, or Firm* — Oliff PLC (57) ABSTRACT

An information processing system includes a first device, a second device, and a notification unit. The first device includes a position sensor and a communication unit. The second device includes a position sensor and a communication unit. The notification unit transmits, in a case where a relative distance between the first device and the second device calculated based on positional information detected by the position sensors exceeds a limit value, an alert to at least one of the first device and the second device.

14 Claims, 9 Drawing Sheets

(56) References Cited

U.S. PATENT DOCUMENTS

| | | | | |
|---|---|---|---|---|
| 2009/0249497 A1* | 10/2009 | Fitzgerald | ......... | H04W 12/1206 |
| | | | | 726/35 |
| 2010/0120406 A1* | 5/2010 | Banga | ..................... | G06F 21/35 |
| | | | | 455/418 |
| 2012/0005417 A1* | 1/2012 | Komatsu | .................. | G06F 21/78 |
| | | | | 711/103 |
| 2014/0002239 A1* | 1/2014 | Rayner | .................. | A45C 13/24 |
| | | | | 340/5.61 |
| 2016/0277560 A1* | 9/2016 | Gruberman | ........ | G06Q 20/3224 |

FOREIGN PATENT DOCUMENTS

| | | |
|---|---|---|
| JP | 2016-167183 A | 9/2016 |
| JP | 2016-195407 A | 11/2016 |

OTHER PUBLICATIONS

Apr. 6, 2021 Office Action issued in Japanese Patent Application No. 2017-145756.

\* cited by examiner

| | SMARTPHONE | PC | MONITORING DEVICE |
|---|---|---|---|
| MONITORING-REQUIRED LEVEL | REPORT MONITORING STATE (SCREEN DISPLAY/SOUND/VIBRATIONS) | DISPLAY/ OPERATION LOCK | IMAGE RECORD |
| CAUTION-REQUIRED LEVEL | REPORT CAUTION STATE (SCREEN DISPLAY/SOUND/VIBRATIONS) | SCREEN FLASH/ SOUND MESSAGE | REPORT TO MANAGEMENT CENTER |
| WARNING LEVEL | REPORT WARNING STATE (SCREEN DISPLAY/SOUND/VIBRATIONS) | SOUND MESSAGE | REPORT MONITORING IMAGE TO MANAGEMENT CENTER |

INFORMATION PROCESSING SYSTEM, INFORMATION PROCESSING APPARATUS, AND NON-TRANSITORY COMPUTER READABLE MEDIUM FOR SECURITY ALERT NOTIFICATION

CROSS-REFERENCE TO RELATED APPLICATIONS

This application is based on and claims priority under 35 USC 119 from Japanese Patent Application No. 2017-145756 filed Jul. 27, 2017.

BACKGROUND

(i) Technical Field

The present invention relates to an information processing system, an information processing apparatus, and a non-transitory computer readable medium.

(ii) Related Art

In telework environments such as working from home, how security may be ensured has been a big issue.

SUMMARY

According to an aspect of the invention, there is provided an information processing system including a first device, a second device, and a notification unit. The first device includes a position sensor and a communication unit. The second device includes a position sensor and a communication unit. The notification unit transmits, in a case where a relative distance between the first device and the second device calculated based on positional information detected by the position sensors exceeds a limit value, an alert to at least one of the first device and the second device.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described with reference to drawings.

First Exemplary Embodiment

Figure 1:
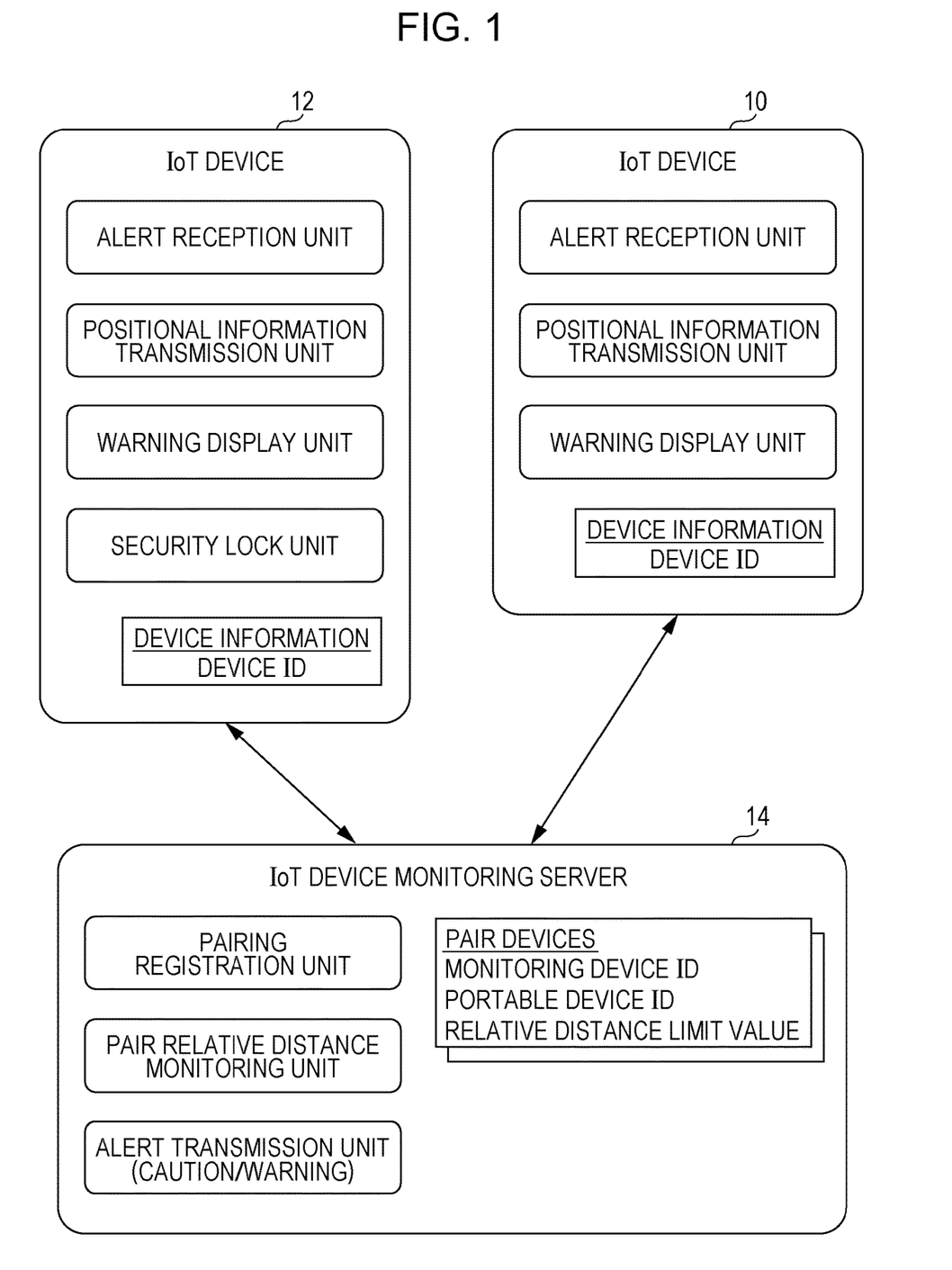
FIG. 1 is a diagram illustrating a configuration of a system according to an exemplary embodiment.

FIG. 1 is a diagram illustrating a system configuration of an information processing system according to an exemplary embodiment. The information processing system includes IoT devices 10 and 12 and an IoT device monitoring server 14. The IoT devices 10 and 12 are connected to the IoT device monitoring server 14 via a communication line so that data may be transferred between each other. The communication line is preferably a wireless line.

The IoT device 10 functions as a first device and is a device such as a smartphone or the like carried by a user. The IoT device 10 includes, as functional modules, an alert reception unit, a positional information transmission unit, a warning display unit, and a device information storing unit. Specifically, the IoT device 10 includes one or more processors, a memory, a communication interface, an input/output interface, a display, and a position sensor. The one or more processors implement the individual functions by reading and executing a processing program stored in a program memory.

That is, a processor implements the positional information transmission unit by transmitting, with predetermined time intervals, positional information of the IoT device 10 detected by the position sensor to the IoT device monitoring server 14 via the communication interface. The position sensor may be, for example, a global positioning system (GPS) sensor.

Furthermore, the processor reads a device ID as device information stored in the memory and transmits, along with the positional information, the device ID to the IoT device monitoring server 14 via the communication interface.

Furthermore, the processor implements the alert reception unit by receiving, via the communication interface, an alert transmitted from the IoT device monitoring server 14.

Furthermore, the processor implements the warning display unit by displaying a predetermined message as a warning on the display when receiving an alert. The display may be a touch panel or the like including a liquid crystal or an organic electroluminescence (EL). However, the display is not limited to this. Furthermore, the warning display unit may include a sound notification unit that drives a built-in speaker to produce a predetermined sound, in addition to a message, or a vibration generation unit that drives a built-in motor to add predetermined vibrations.

The IoT device 12 functions as a second device and is a device such as a personal computer (PC) or a tablet as a device of a user. Regarding a device in an exemplary embodiment, the ownership of the device does not necessarily belong to a user, and a user may only need to have the right to legally use the device. Therefore, an owner of the IoT device 12 may actually be a company that a user belongs to. The IoT device 12 includes, as functional modules, an alert reception unit, a positional information transmission unit, a warning display unit, a security lock unit, and a device information storing unit. Specifically, the IoT device 12 includes one or more processors, a memory, a communication interface, an input/output interface, a display, and a position sensor. The one or more processors implement the individual functions by reading and executing a processing program stored in a program memory.

That is, a processor implements the positional information transmission unit by transmitting, with predetermined time intervals, positional information of the IoT device 12 detected by the position sensor to the IoT device monitoring server 14 via the communication interface. The position sensor may be, for example, a GPS sensor.

Furthermore, the processor reads a device ID as device information stored in the memory and transmits, along with the positional information, the device ID to the IoT device monitoring server 14 via the communication interface.

Furthermore, the processor implements the alert reception unit by receiving, via the communication interface, an alert transmitted from the IoT device monitoring server 14.

Furthermore, the processor implements the warning display unit by displaying a predetermined message as a warning on the display when receiving an alert. The display may be a touch panel or the like including a liquid crystal or an organic EL. However, the display is not limited to this. Furthermore, the warning display unit may include a sound notification unit that drives a built-in speaker to produce a predetermined sound, in addition to a message.

Furthermore, the processor implements the security lock unit by executing predetermined lock processing for inhibiting operation on a device such as a PC or a tablet when receiving an alert. The predetermined lock processing may be causing the screen of the display to enter a non-display state, inhibiting reception of input from a keyboard, or the like. However, the predetermined lock processing is not limited to this.

The IoT device monitoring server 14 functions as a notification unit or an information processing apparatus, receives positional information of the IoT devices 10 and 12, and monitors the relative distance between the IoT devices 10 and 12. The IoT device monitoring server 14 may be configured as a multifunction apparatus or an image forming apparatus having multiple functions including copying, facsimile transmission/reception, printing, scanning, and the like. The IoT device monitoring server 14 includes, as functional modules, a pairing registration unit, a pair relative distance monitoring unit, an alert transmission unit, and a pair device information storing unit. Specifically, the IoT device monitoring server 14 includes one or more processors, a memory, a communication interface, an input/output interface, and a display. The one or more processors implement the individual functions by reading and executing a processing program stored in a program memory.

That is, the processor implements the pairing registration unit by receiving device information (device IDs) from the IoT devices 10 and 12 via the communication interface and registering the IoT devices 10 and 12 as pairing devices into the memory in response to a pairing request. The pairing request is transmitted from either the IoT device 10 or the IoT device 12. The processor may automatically register IoT devices that keep staying within a short distance from each other for a predetermined time or more as pairing devices into the memory. Regardless of whether registration is performed manually or automatically, the processor notifies, via the communication interface, the IoT devices 10 and 12 that the IoT devices 10 and 12 are registered as pairing devices. The processor may notify only the IoT device 10 of the registration.

Furthermore, the processor implements the pair relative distance monitoring unit by receiving positional information from the IoT devices 10 and 12 via the communication interface and calculating the relative distance between the IoT devices 10 and 12. For the relative distance, radio electric field strength (trilateration), network information, short-distance radio communication histories (passing time), or the like may be used. In the case where positional information is three-dimensional positional information obtained by the GPS, the relative distance may be calculated based on the three-dimensional positional information. The processor compares the obtained relative distance with a limit value stored in the memory, and determines whether or not the relative distance exceeds the limit value. The limit value may be a fixed value or a variable value corresponding to the IoT devices 10 and 12. A user may manually set the limit value and the IoT device 10 or 12 may transmit the limit value to the IoT device monitoring server 14. The processor stores the limit value (relative distance limit value) for the IoT devices 10 and 12, along with device IDs of the IoT devices 10 and 12, into the memory.

The processor implements the alert transmission unit by transmitting a predetermined alert to the IoT devices 10 and 12 via the communication interface when the relative distance exceeds the limit value. The alert is a message or the like as caution or warning information to a user. The IoT devices 10 and 12 that have received an alert from the IoT device monitoring server 14 display a warning on the warning display unit as described above.

An "IoT device" in an exemplary embodiment represents a component of Internet of things (IoT), and may be defined as a device including a sensor and a communication function.

Next, a process in an exemplary embodiment will be described in detail by way of example in which a smartphone is used as the IoT device 10 and a PC is used as the IoT device 12.

Figure 2:
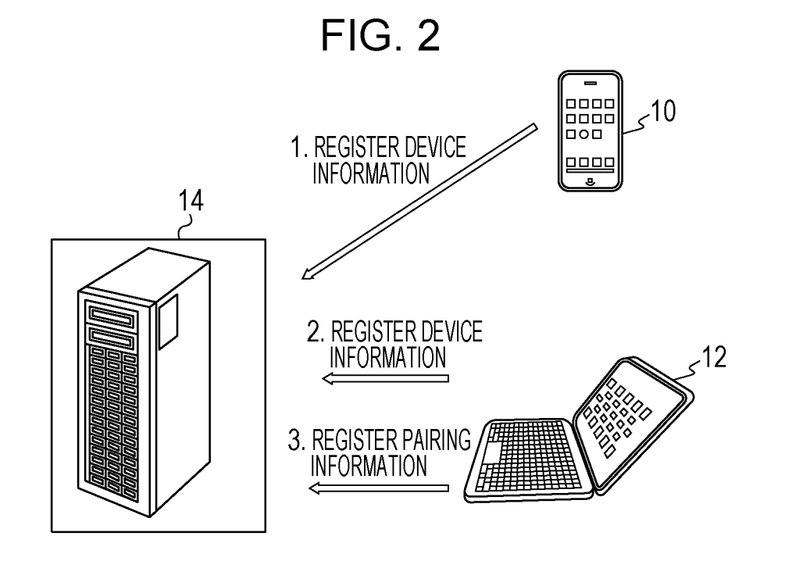
FIG. 2 is an explanatory diagram illustrating a flow of data in an exemplary embodiment.

FIG. 2 illustrates a flow of data when pairing registration is performed in an exemplary embodiment. The processor of the IoT device 10 reads a device ID stored in the memory and transmits, via the communication interface and the wireless line, the device ID to the IoT device monitoring server 14. The processor of the IoT device 12 also reads a device ID stored in the memory and transmits, via the communication interface and the wireless line, the device ID to the IoT device monitoring server 14. The device ID is a universally unique identifier (UUID) or the like and represents an ID for uniquely identifying a device.

The processor of the IoT device monitoring server 14 presents to a user pairing candidates from among multiple IoT devices that are located close to each other. In this case, the processor of the IoT device monitoring server 14 transmits information of the IoT device 10 and the IoT device 12 as pairing candidates to the IoT devices 10 and 12, and the processors of the IoT devices 10 and 12 present the received pairing candidates by displaying them on the displays. A user operates, for example, the IoT device 12 to accept the pairing candidates, and transmits information indicating that the IoT devices 10 and 12 are accepted as pairing candidates as a pairing information registration request to the IoT device monitoring server 14. The processor of the IoT device monitoring server 14 receives the pairing registration request from the IoT device 12, and stores information of the pair of the IoT devices 10 and 12, which are accepted by the user, and a relative distance limit value into the memory. The relative distance limit value may be a fixed value such as 10 meters or may be set by the user and transmitted, along with the pairing information registration request, to the IoT device monitoring server 14.

Figure 3:
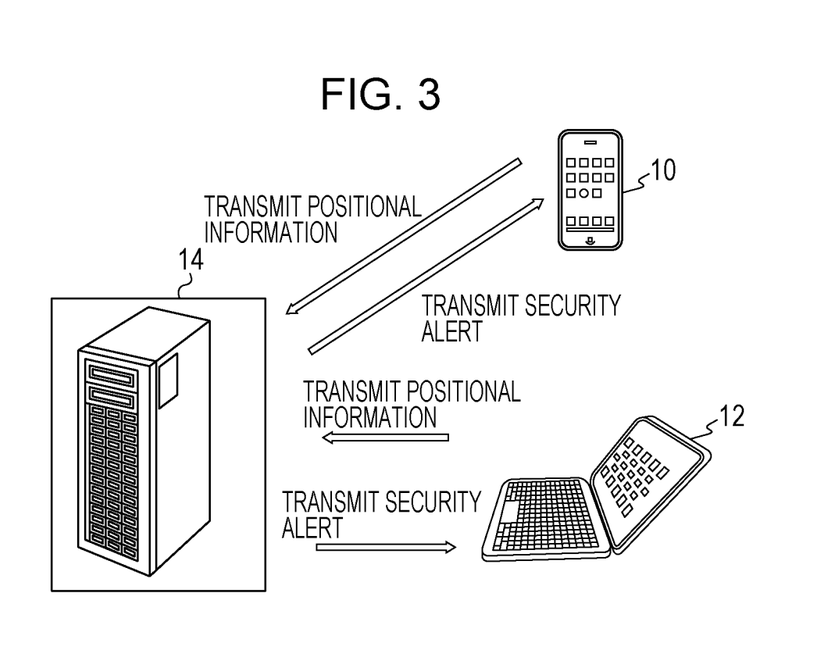
FIG. 3 is another explanatory diagram illustrating a flow of data in an exemplary embodiment.

FIG. 3 illustrates a flow of data when a relative distance is monitored after pairing registration is performed. The processor of the IoT device 10 and the processor of the IoT device 12 transmit individual positional information and device IDs to the IoT device monitoring server 14 with predetermined time intervals. The processor of the IoT device monitoring server 14 calculates the relative distance between the IoT devices 10 and 12 based on the positional information of the IoT devices 10 and 12 for which pairing registration is performed, and compares the relative distance with a limit value stored in the memory. In the case where the obtained relative distance exceeds the limit value, the processor of the IoT device monitoring server 14 transmits an alert (security alert) notification to the IoT devices 10 and 12.

When receiving the security alert, the processor of the IoT device 10 and the processor of the IoT device 12 perform processing corresponding to the state or level of the alert.

Figure 4:
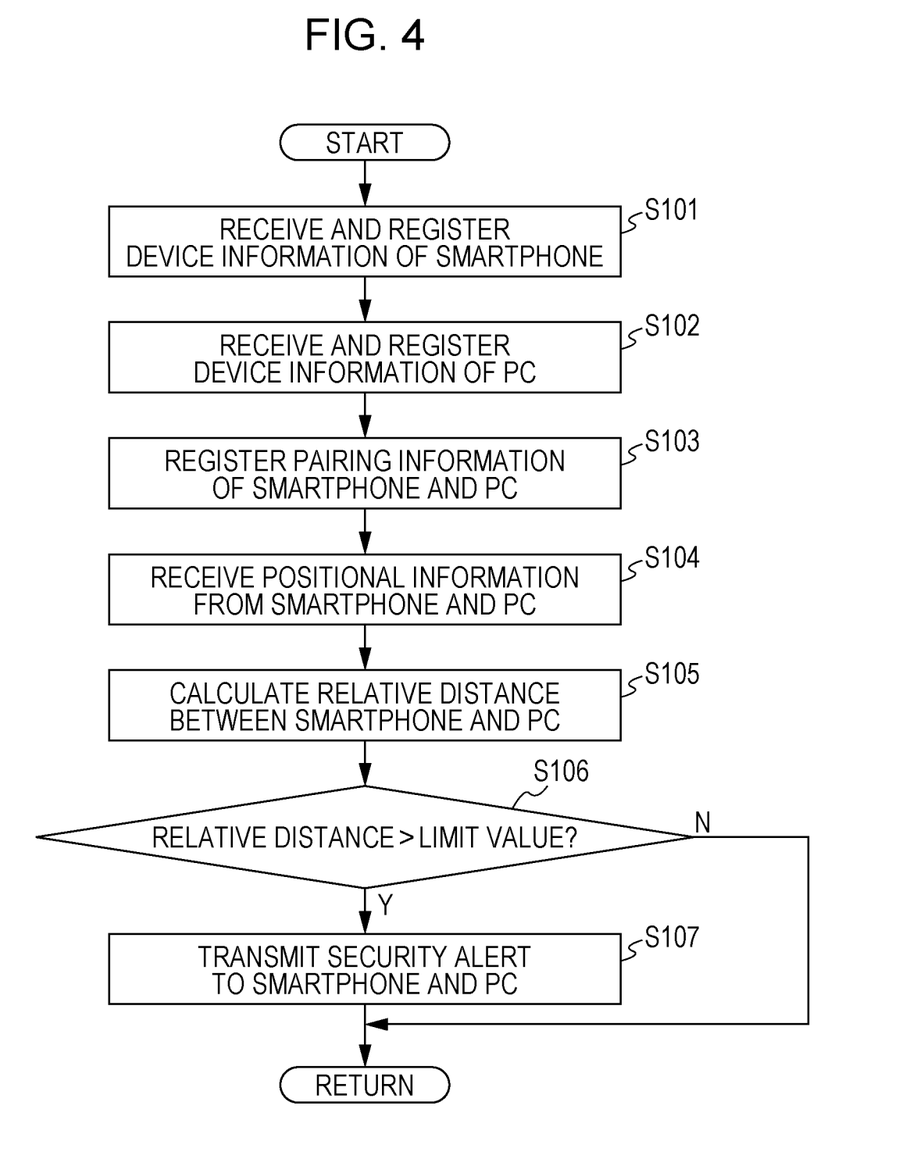
FIG. 4 is a flowchart of a process in an exemplary embodiment.
Figure 5:
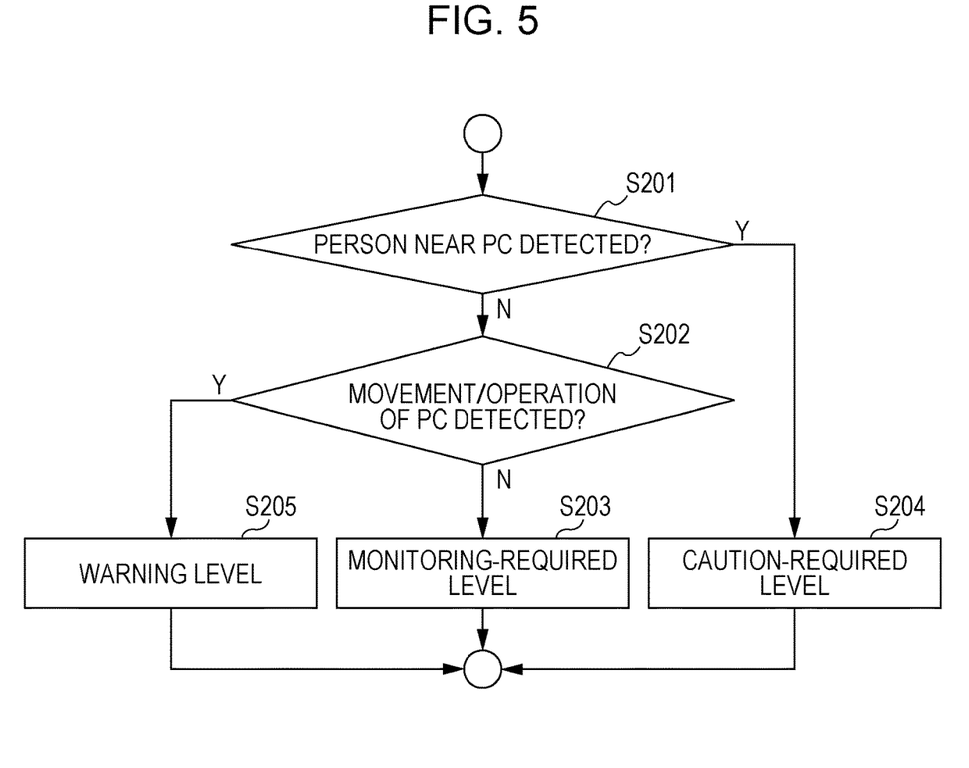
FIG. 5 illustrates a security alert notification process in an exemplary embodiment.

FIGS. 4 and 5 are flowcharts each illustrating a process of the IoT device monitoring server 14. The processor of the IoT device monitoring server 14 receives device information (device ID) transmitted from the IoT device 10, and registers the device information into the memory (S101). The IoT device monitoring server 14 also receives device information (device ID) transmitted from the IoT device 12, and registers the device information into the memory (S102). At this time, the IoT device monitoring server 14 also receives positional information of the IoT device 10 and the IoT device 12. In the case where the processor of the IoT device monitoring server 14 determines, based on the positional information of the IoT devices 10 and 12, that the IoT device 10 and the IoT device 12 are located close to each other at a predetermined distance or less from each other, the processor extracts the IoT devices 10 and 12 as pairing candidates, and notifies the IoT devices 10 and 12 that the IoT devices 10 and 12 are extracted as pairing candidates. The predetermined distance is stored in advance in the memory. The predetermined distance may not be the same as the limit value.

A user operates, for example, the IoT device 12 to confirm the pairing candidates, accepts pairing registration for the IoT devices 10 and 12, and transmits information indicating that pairing registration of the IoT devices 10 and 12 is accepted to the IoT device monitoring server 14.

The processor of the IoT device monitoring server 14 receives the information indicating the acceptance from the user, and registers the device IDs of the IoT devices 10 and 12 as pairing information into the memory (S103). At this time, the processor of the IoT device monitoring server 14 may notify the IoT devices 10 and 12 that the IoT devices 10 and 12 are registered as pairing information.

After registering the pairing information, the processor receives positional information from the IoT devices 10 and 12 (S104), and calculates the relative distance between the IoT devices 10 and 12 (S105). Then, the processor compares the obtained relative distance with a limit value (S106).

In the case where the relative distance is less than or equal to the limit value (No in S106), the processor does not transmit a security alert. In contrast, in the case where the relative distance exceeds the limit value (Yes in S106), the processor transmits security alert information to each of the IoT devices 10 and 12 (S107). Therefore, for example, in the case where the user is carrying the IoT device 10 and operating the IoT device 12 on a table while sitting on a chair, it is determined that the relative distance is less than or equal to the limit value, and a security alert is not transmitted. In the case where the user leaves his/her seat and is away from the IoT device 12 while carrying the IoT device 10, it is determined that the relative distance is more than the limit value, and a security alert is transmitted. After that, processing of S104 to S107 is performed repeatedly.

As a result of repeated execution of the processing of S104 to S107, a situation may occur in which it is determined that the relative distance is less than or equal to the limit value at a timing, it is determined that the relative distance is more than the limit value at another timing, and it is determined that the relative distance is less than or equal to the limit value at still another timing. Furthermore, it may be continuously determined for a certain period of time that the relative distance is more than the limit value. In the case where it is determined for a certain period of time that the relative distance is more than the limit value, further processing different from transmission of a security alert may be performed.

FIG. 5 is a detailed flowchart illustrating a process for a case where it is determined in S106 that the relative distance is more than the limit value and a security alert is transmitted in S107.

The processor of the IoT device monitoring server 14 acquires an image obtained by a monitoring camera or the like installed near the IoT device 12, and determines whether or not there is a person near the IoT device 12 (S201). A monitoring camera monitors, for example, an area in which the IoT device 12 is located as a monitoring area. The processor extracts a corresponding monitoring camera, in accordance with positions where plural monitoring cameras are installed and the positional information of the IoT device 12, and acquires an image obtained by the extracted monitoring camera.

In the case where no person near the IoT device 12 is detected from the image obtained by the monitoring camera (No in S201), the processor further determines whether or not movement or operation of the IoT device 12 is detected (S202). A determination as to whether or not the IoT device 12 is moved is obtained based on the position information received from the IoT device 12, and a determination as to whether or not the IoT device 12 is operated is obtained based on operation information transmitted from the processor of the IoT device 12.

In the case where the IoT device 12 is not moved or operated (S202), it is determined that the IoT device 12 is not illegally operated or stolen by a third party, and the processor transmits, as a security alert, an alert at a "monitoring-required level" to the IoT devices 10 and 12 (S203).

In contrast, in the case where the determination result in S201 is Yes, that is, in the case where there is a person near the IoT device 12 (in this case, the relative distance between the IoT devices 10 and 12 exceeds the limit value, and therefore, the detected person is not a legal user of the IoT device 12 who is carrying the IoT device 10), the processor considers that there is a possibility that the IoT device 12 may be illegally used or stolen by a third party, and transmits, as a security alert, an alert at a "caution-required level" to the IoT devices 10 and 12 (S204). Furthermore, in the case where the determination result in S202 is Yes, that is, in the case where the IoT device 12 is moved or operated, the processor transmits, as a security alert, an alert at a "warning level" to the IoT devices 10 and 12 (S205). The degree or level of a security alert is lowered in the order of warning, caution-required, and monitoring-required.

Figure 6:
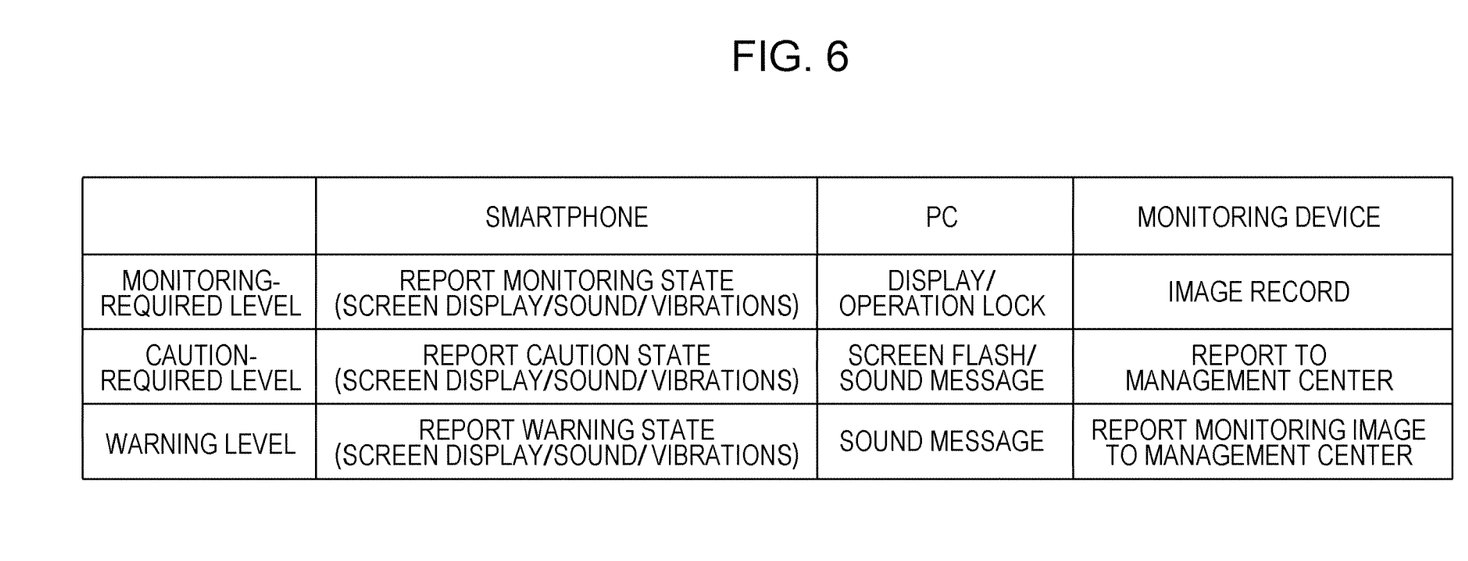
FIG. 6 is an explanatory diagram of processing contents for each level in an exemplary embodiment.

FIG. 6 illustrates operation of the IoT device 10, the IoT device 12, and a monitoring camera as a monitoring device for each degree or level of a security alert.

In the case of the monitoring-required level, the processor of the IoT device 10 receives an alert from the IoT device monitoring server 14, and notifies a user of a monitoring state. That is, the processor of the IoT device 10 displays on the display a message indicating the monitoring state, and notifies the user of the monitoring state using sound and vibrations. The massage may be, for example, "Monitoring has started." or the like. Furthermore, the processor of the IoT device 12 locks the display and the operation unit such as a keyboard to enter an operation inhibition state. Furthermore, the monitoring camera records an image near the IoT device 12. In the case where the monitoring camera constantly records images, the recording state is maintained. An image in a limited monitoring region near the IoT device 12 may be recorded or an image near the IoT device 12 may be recorded with higher resolution.

In the case of the caution-required level, the processor of the IoT device 10 receives an alert from the IoT device monitoring server 14, and notifies a user of the caution-required state. That is, the processor of the IoT device 10 displays on the display a message indicating a caution state, and notifies the user of the caution state using sound and vibrations. The message may be, for example, "Caution is required." or the like. Furthermore, the processor of the IoT device 12 displays a screen in a flashing manner, and outputs a sound message. The processor of the IoT device 12 is in the operation inhibition state. The sound message may be, for example, "In the caution mode." or the like. Furthermore, the monitoring camera notifies a predetermined management center of the caution-required state. The management center is an organization that manages and operates a monitoring camera and is in charge of security in an area in which the IoT device 12 exists.

In the case of the warning level, the processor of the IoT device 10 receives an alert from the IoT device monitoring server 14, and notifies a user of a warning state. That is, the processor of the IoT device 10 displays on the display a message indicating the warning state, and notifies the user of the warning state using sound and vibrations. The message may be, for example, "Danger. Please check the device." or the like. Furthermore, the processor of the IoT device 12 outputs a sound message. The sound message may be, for example, "A notification is being sent to the center." or the like. The IoT device 12 is in the operation inhibition state. Furthermore, the monitoring camera sends the notification by transmitting an image (monitoring image) near the IoT device 12 to the management center. At this time, the notification may be sent to the management center with the highest priority.

The degree or level of a security alert may vary with time. In the case where a user uses the IoT device 12 while being seated, no alert is transmitted. When a user leaves his/her seat to take a rest and the distance between the user and the IoT device 12 exceeds a limit value, the IoT device 12 enters the monitoring-required level. When the user approaches the IoT device 12 after taking a rest and the distance between the user and the IoT device 12 is less than or equal to the limit value, the IoT device 12 returns from the monitoring-required level to a normal level (level at which no alert is transmitted). In contrast, when a third party approaches the IoT device 12 in the monitoring-required level, the IoT device 12 changes from the monitoring-required level to the caution-required level. Furthermore, when the third party moves the IoT device 12, the IoT device 12 changes from the caution-required level to the warning level.

Figure 7:
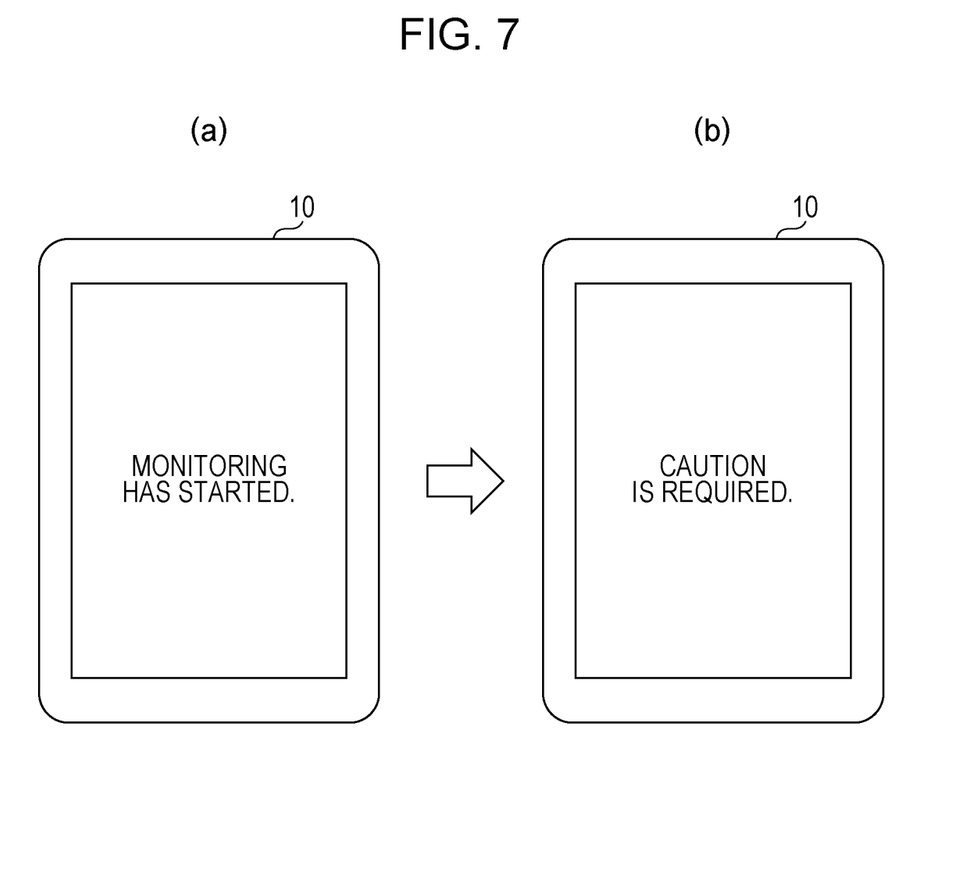
FIG. 7 is an explanatory diagram of a screen of an IoT device in an exemplary embodiment.

FIG. 7 illustrates an example in which a message displayed on the display of the IoT device 10 is changed when the degree or level of a security alert changes from the monitoring-required level to the caution-required level. In the normal level (level at which no alert is transmitted), a particular message is not displayed on the display. However, when the monitoring-required level is entered, a message such as "Monitoring has started." is displayed on the display, as illustrated in part (a) of FIG. 7. With this message, sound and vibrations are output. Therefore, the user is able to understand that the IoT device 12 has entered the monitoring-required level by visually recognizing the message.

When the degree or level of a security alert changes from the monitoring-required level to the caution-required level, a message such as "Caution is required." is displayed on the display, as illustrated in part (b) of FIG. 7. With this message, sound and vibrations are output. Therefore, the user is able to understand that the IoT device 12 is in the caution-required level, that is, a third party is approaching the IoT device 12, by visually recognizing the message. Thus, the user is able to quickly take an action such as returning near the IoT device 12. When the user returns near the IoT device 12 and the relative distance becomes less than or equal to the limit value, the IoT device 12 returns from the caution-required level to the normal level.

Second Exemplary Embodiment

In the first exemplary embodiment, pairing registration of the IoT device 10 and the IoT device 12 is performed and the relative distance between the IoT devices 10 and 12 is monitored. However, the IoT device 12 and another IoT device near the IoT device 12 may form a group, and the IoT device near the IoT device 12 may be monitored, so that a security alert may be transmitted.

Figure 8:
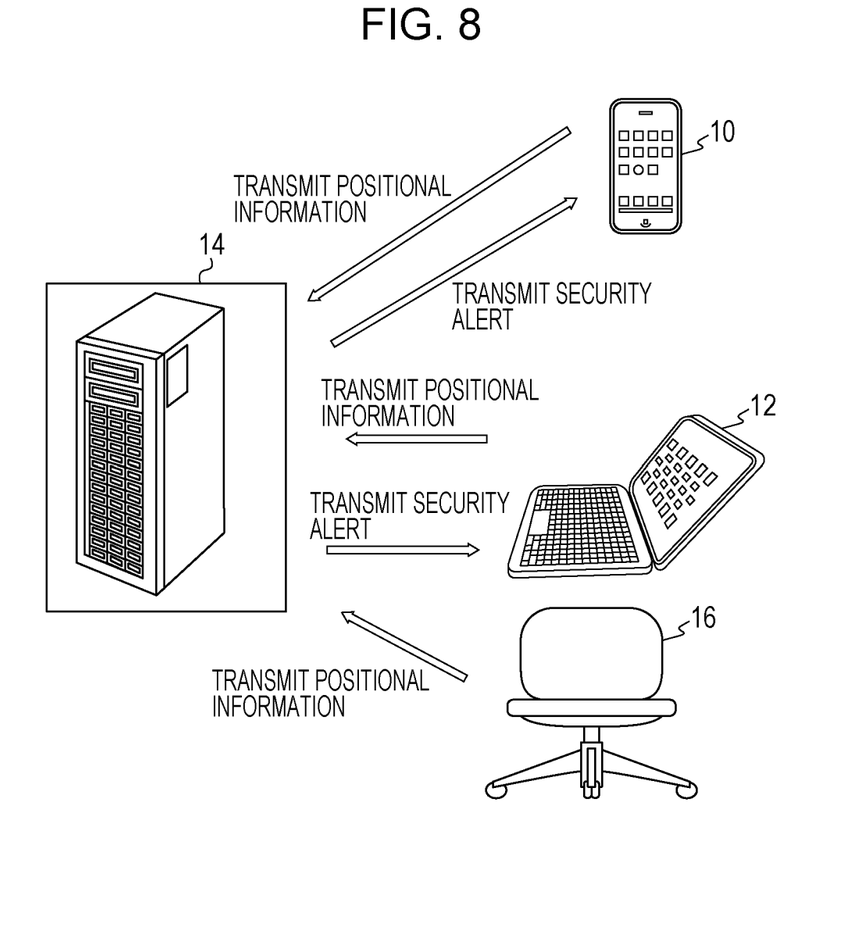
FIG. 8 is an explanatory diagram illustrating a flow of data in another exemplary embodiment.

FIG. 8 is a diagram illustrating a configuration of a system according to the second exemplary embodiment. In addition to the IoT devices 10 and 12 and the IoT device monitoring server 14, a chair 16 near the IoT device 12 is provided. The chair 16 is also an IoT device. The chair 16 functions as a third device and includes a sensor and a communication function. A processor, a memory, and a position sensor are embedded in the chair 16. The processor transmits positional information of the chair 16 detected by the position sensor and a device ID stored in the memory to the IoT device monitoring server 14.

The processor of the IoT device monitoring server 14 performs pairing registration of the IoT devices 10 and 12 as in the first exemplary embodiment, and performs group registration of the IoT device 12 and the chair 16. In the group registration, as in the pairing registration, group candidates are notified to the IoT device 10 and the IoT device 12, and group registration is performed when acceptance by a user is received. Device IDs of the registered group, that is, the IoT device 12 and the chair 16, are stored in the memory of the IoT device monitoring server 14.

After performing pairing registration and group registration, the processor of the IoT device monitoring server 14 calculates the relative distance between the IoT devices 10 and 12 as in the first exemplary embodiment, and determines whether or not the relative distance exceeds a limit value. In the case where the relative distance exceeds the limit value, the degree or level of a security alert changes from the normal level to the monitoring-required level, and an alert is transmitted to the IoT device 10 and the IoT device 12. In the monitoring-required level, movement of the chair 16 is monitored. In the case where the chair 16 is moved or operated, the degree or level of a security alert is raised from the monitoring-required level to the caution-required level.

Figure 9:
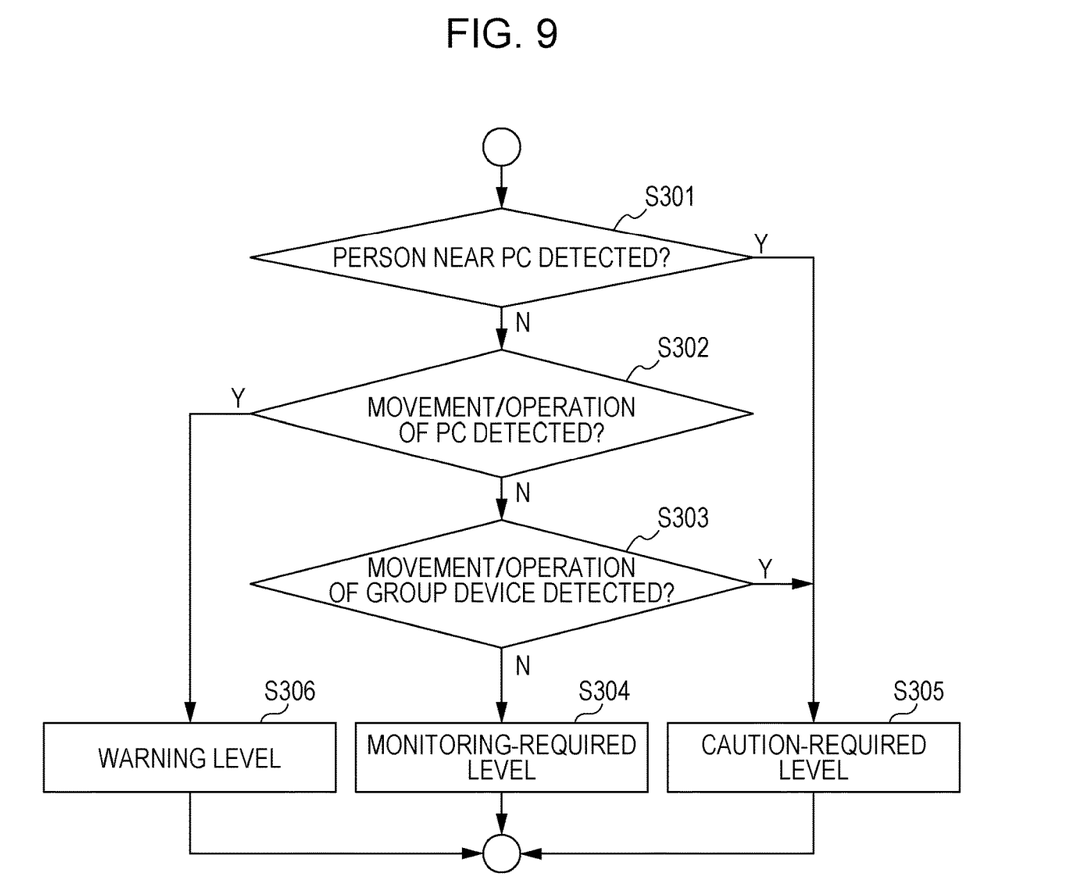
FIG. 9 illustrates a security alert notification process in another exemplary embodiment.

FIG. 9 is a detailed flowchart of notification of a security alert to the IoT devices 10 and 12 in the second exemplary embodiment (processing of S107 in FIG. 4). In the first exemplary embodiment, as illustrated in FIG. 5, a determination as to whether or not a person near the IoT device 12 is detected is performed based on an image obtained by the monitoring camera and a determination as to whether or not movement or operation of the IoT device 12 is detected is performed. In the second exemplary embodiment, a determination as to whether or not movement or operation of the chair 16 as a group device is detected is performed (S301, S302, and S303).

In the case where all the determination results of S301, S302, and S303 are No, that is, in the case where there is no person near the IoT device 12, movement or operation of the IoT device 12 is not detected, and movement or operation of the chair 16 is not detected, the processor of the IoT device monitoring server 14 transmits an alert at the monitoring-required level (S304). In contrast, in the case where a third party near the IoT device 12 is detected (Yes in S301) or movement or operation of the chair 16 as a group device is detected (Yes in S303), the processor transmits an alert at the caution-required level (S305). Furthermore, in the case where movement or operation of the IoT device 12 is detected (Yes in S302), the processor transmits an alert at the warning level (S306).

In the second exemplary embodiment, in the case where a user levers his/her seat and the relative distance between the user and the IoT device 12 exceeds a limit value, when a third party moves the chair 16 or operates the chair 16, an alert at the caution-required level is transmitted. Therefore, the IoT device 12 may be prevented from being illegally used or stolen.

The exemplary embodiments of the present invention have been described above. However, the present invention is not limited to the foregoing exemplary embodiments, and various modifications may be made to the present invention. Modifications will be described below.

<Modification 1>

In an exemplary embodiment, the IoT device 12 is illustrated as a device of a user. However, an information device such as a PC or a tablet, an electronic device, a bag including a sensor and a communication function, or the like may be used as a device of a user. A bag that includes a device or an electronic tag including a sensor and a communication function may function as the IoT device 12. In this case, it is desirable that sound or light is output from the device or electronic tag at the monitoring-required level and a sound message is output at the warning level.

<Modification 2>

In an exemplary embodiment, in an alert notification at the warning level, the monitoring camera transmits a monitoring image to the management center. However, a further action may be taken according to need. For example, upon receiving an alert, the management center closes down the area in which the IoT device 12 is located, more specifically, temporarily locks the door of a room or the like.

<Modification 3>

In an exemplary embodiment, an image forming apparatus (or a multifunction apparatus) is caused to function as the IoT device monitoring server 14, calculates the relative distance between the IoT device 10 and the IoT device 12, compares the obtained relative distance with a limit value, and transmits an alert to the IoT devices 10 and 12 when the relative distance exceeds the limit value. However, a configuration may be provided in which the image forming apparatus is caused to simply function as a relay server, receives positional information and device IDs from the IoT devices 10 and 12, and transmits the received positional information and device IDs to another Internet server (or a cloud server) via the Internet or the like, the Internet server (or the cloud server) calculates the relative distance, compares the obtained relative distance with a limit value, and transmits a comparison result to the image forming apparatus as the relay server, and the image forming apparatus transmits an alert to the IoT devices 10 and 12.

Figure 10:
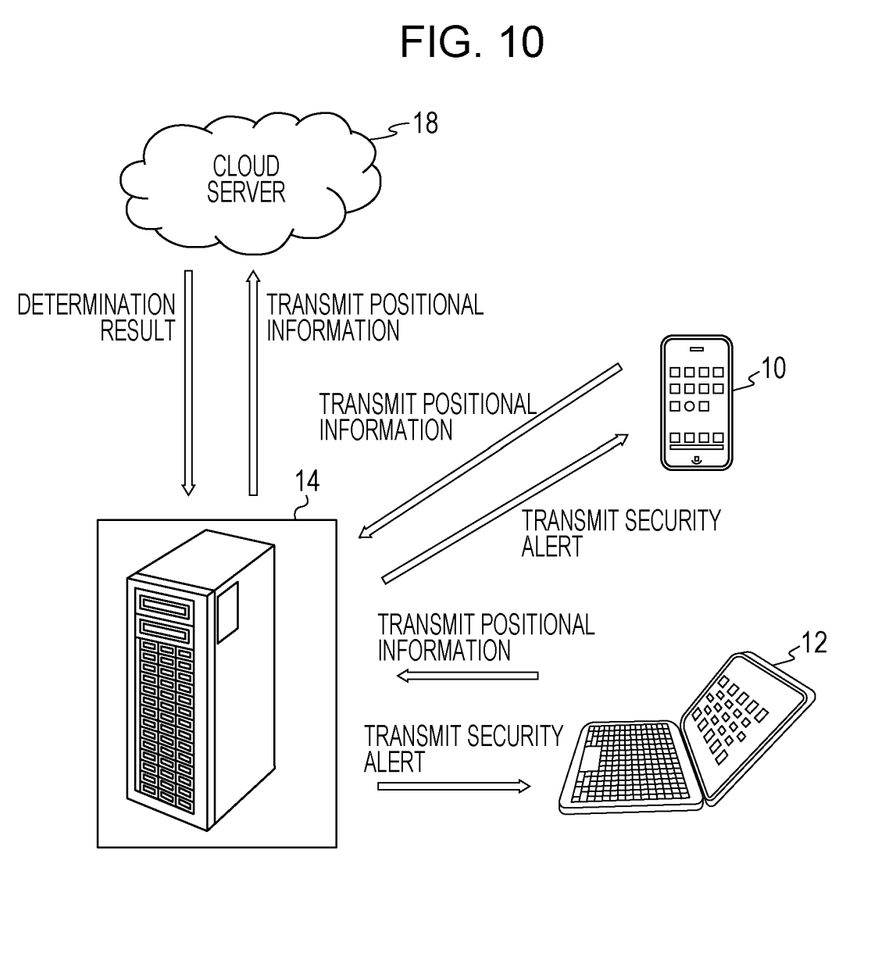
FIG. 10 is a diagram illustrating a configuration of a system according to a modification.

FIG. 10 is a diagram illustrating a configuration of a system according to Modification 3. The IoT device monitoring server 14 is an image forming apparatus, receives positional information and device IDs from the IoT device 10 and the IoT device 12, and transmits (uploads) the received positional information and device IDs to a cloud server 18. The cloud server 18 calculates the relative distance between the IoT device 10 and the IoT device 12 based on the positional information, and compares the obtained relative distance with a limit value. The limit value may be stored in advance in a memory of the cloud server 18 or may be transmitted from the IoT device monitoring server 14. The cloud server 18 transmits a comparison result to the IoT device monitoring server 14. The IoT device monitoring server 14 transmits an alert to the IoT devices 10 and 12 in accordance with the comparison result. In the case where a person near the IoT device 12 is detected, the IoT device 12 is moved or operated, or the chair 16 is moved or operated, the IoT device monitoring server 14 changes the state or level of an alert based on a detection signal, and transmits an alert according to the changed state or level.

<Modification 4>

In an exemplary embodiment, an image forming apparatus (or a multifunction apparatus) is caused to function as the IoT device monitoring server 14, calculates the relative distance between the IoT device 10 and the IoT device 12, compares the obtained relative distance with a limit value, and transmits an alert to the IoT devices 10 and 12 when the relative distance exceeds the limit value. However, the system may have a simpler configuration including the IoT device 10 and the IoT device 12, without using the IoT device monitoring server 14. Specifically, the IoT device 10 transmits positional information and a device ID to the IoT device 12. The processor of the IoT device 12 calculates the relative distance between the IoT device 10 and the IoT device 12 based on the positional information of the IoT device 10 and positional information of the IoT device 12, and determines whether or not the obtained relative distance exceeds a limit value. In the case where the relative distance exceeds the limit value, the processor causes the IoT device 12 to enter the monitoring-required level, displays a message on the display, and transmits an alert at the monitoring-required level to the IoT device 10.

<Modification 5>

In an exemplary embodiment, positional information is received from the IoT device 10 and the IoT device 12, the relative distance between the IoT device 10 and the IoT device 12 is obtained, and a comparison between the obtained relative distance and a limit value is performed. However, even in the case where positional information is not obtained for some reason and the relative distance between the IoT device 10 and the IoT device 12 is not calculated, an alert at the monitoring-required level may be transmitted to the IoT devices 10 and 12.

<Modification 6>

In an exemplary embodiment, an alert is transmitted to the IoT device 10 and the IoT device 12 when the relative distance between the IoT device 10 and the IoT device 12 exceeds a limit value. However, an alert may be transmitted only to the IoT device 10 or only to the IoT device 12. Information indicating which device an alert is to be transmitted to may be set in advance by a user, and the information may be stored in the IoT device monitoring server 14.

<Modification 7>

In an exemplary embodiment, the IoT device monitoring server 14 performs pairing registration by extracting the IoT device 10 and the IoT device 12 that are located close to each other as pairing candidates, notifying the IoT devices 10 and 12 that the IoT devices 10 and 12 have been extracted as pairing candidates, and receiving acceptance by a user. However, for example, the IoT device 10 may transmit a device ID of the IoT device 12 to the IoT device monitoring server 14 to send a request for pairing registration, and the processor of the IoT device monitoring server 14 may perform pairing registration of the IoT device 10 and the IoT device 12 in response to the request. That is, positional information is not necessarily used for pairing registration. In the case where the processor of the IoT device monitoring server 14 receives positional information from plural IoT devices, the processor extracts, based on device IDs for which pairing registration is performed as a key, positional information of the paired devices, calculates the relative distance between the devices, and transmits a security alert using the device IDs.

<Modification 8>

In an exemplary embodiment, messages listed below may be displayed on the display of the IoT device 10 according to the level of an alert.

Monitoring-required level: "Monitoring has started."
Caution-required level: "Caution is required."
Warning level: "Danger. Please check the device."

However, these messages may be customized by a user in an appropriate manner. For example, by using an application installed in the IoT device 10, the setting may be performed as described below.

Level 1: "In the monitoring mode"
Level 2: "In the caution mode"
Level 3: "In the warning mode"

When an alert at level 1 corresponding to the monitoring-required level is received from the IoT device monitoring server 14, a message "In the monitoring mode" is displayed. When an alert at level 2 corresponding to the caution-required level is received, a message "In the caution mode" is displayed. Suitably, the color of a message may be changed according to the level of an alert. In the case where the IoT device 12 may be directly operated by the IoT device 10, when a message "In the monitoring mode" is displayed on the display of the IoT device 10, a user may operate the IoT device 10 to cause the IoT device 12 to enter the operation inhibition state or may determine whether or not operation of the IoT device 12 is locked and allow a control signal for issuing an instruction to lock the operation of the IoT device 12 to be automatically transmitted to the IoT device 12 when operation of the IoT device 12 is not locked.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first device that includes a position sensor and a communication unit;
a second device that includes a position sensor and a communication unit; and
a notification unit that transmits, in a case where a relative distance between the first device and the second device calculated based on positional information detected by the position sensors exceeds a limit value, an alert to at least one of the first device and the second device, wherein
in a case where the relative distance exceeds the limit value, the notification unit transmits the alert at one of a plurality of different levels according to whether or not a person is detected inside a monitoring area near the second device.

2. The information processing system according to claim 1, further comprising
a monitoring camera that monitors the monitoring area near the second device to detect whether or not there is a person inside the monitoring area.

3. The information processing system according to claim 1, wherein
in a case where the relative distance exceeds the limit value, the notification unit transmits the alert at one of a plurality of different levels according to whether or not there is a movement or operation of the second device.

4. The information processing system according to claim 1, further comprising:
a third device that includes a position sensor and a communication unit and is located near the second device,
wherein in a case where the relative distance exceeds the limit value, the notification unit transmits the alert at one of a plurality of different levels according to whether or not there is a movement or operation of the third device.

5. The information processing system according to claim 1,
wherein the notification unit is provided at a monitoring server.

6. The information processing system according to claim 1,
wherein the notification unit is provided at an image forming apparatus.

7. The information processing system according to claim 1,
wherein the first device is a smartphone, and
wherein the second device is a personal computer or a tablet.

8. The information processing system according to claim 7,
wherein in a case where the relative distance exceeds the limit value, the notification unit transmits the alert to the smartphone, causes a display of the smartphone to display a message, transmits the alert to the personal computer or tablet, and causes the personal computer or tablet to enter an operation inhibition state.

9. The information processing system according to claim 1,
wherein the first device is a smartphone, and
wherein the second device is a bag.

10. The information processing system according to claim 9,
wherein in a case where the relative distance exceeds the limit value, the notification unit transmits the alert to the smartphone, causes a display of the smartphone to display a message, transmits the alert to the bag, and causes the bag to output sound.

11. An information processing apparatus comprising:
a processor programmed to:
receive positional information from a first device and a second device each including a position sensor and a communication unit;
calculate a relative distance between the first device and the second device based on the positional information; and
transmit, in a case where the relative distance exceeds a limit value, an alert to at least one of the first device and the second device, wherein
in a case where the relative distance exceeds the limit value, the alert is transmitted at one of a plurality of different levels according to whether or not a person is detected inside a monitoring area near the second device.

12. A non-transitory computer readable medium storing a program causing a computer to execute a process for information processing, the process comprising:
receiving positional information from a first device and a second device;
calculating a relative distance between the first device and the second device based on the positional information;
comparing the relative distance with a limit value; and
transmitting, in a case where the relative distance exceeds the limit value, an alert to at least one of the first device and the second device, wherein
in a case where the relative distance exceeds the limit value, the alert is transmitted at one of a plurality of different levels according to whether or not a person is detected inside a monitoring area near the second device.

13. An information processing system comprising:
a first device that includes a position sensor and a communication unit;
a second device that includes a position sensor and a communication unit; and
a notification unit that transmits, in a case where a relative distance between the first device and the second device calculated based on positional information detected by the position sensors exceeds a limit value, an alert to at least one of the first device and the second device, wherein
in a case where the relative distance exceeds the limit value, the notification unit transmits the alert at one of a plurality of different levels according to whether or not there is a movement or operation of at least one of the second device and a device near the second device.

14. An information processing system comprising:
a first device that includes a position sensor and a communication unit;
a second device that includes a position sensor and a communication unit;
a notification unit that transmits, in a case where a relative distance between the first device and the second device calculated based on positional information detected by the position sensors exceeds a limit value, an alert to at least one of the first device and the second device; and
a third device that includes a position sensor and a communication unit and is located near the second device,
wherein in a case where the relative distance exceeds the limit value, the notification unit transmits the alert at one of a plurality of different levels according to whether or not there is a movement or operation of the third device.

* * * * *